United States Patent [19]
Kopp et al.

[11] Patent Number: 5,188,483
[45] Date of Patent: Feb. 23, 1993

[54] SUBSEA PIPELINE RECOVERY CLAMP

[75] Inventors: Frans Kopp, Houston; Joe O. Esparza, Katy; Thomas E. Long, Montgomery, all of Tex.

[73] Assignee: Shell Oil Company, Houston, Tex.

[21] Appl. No.: 735,505

[22] Filed: Jul. 25, 1991

[51] Int. Cl.[5] .................................................. F16L 1/04
[52] U.S. Cl. .................................... 405/191; 405/173; 405/158; 166/338
[58] Field of Search ............... 405/173, 154, 188, 191; 166/343, 342, 341, 340

[56] References Cited
U.S. PATENT DOCUMENTS

| | | |
|---|---|---|
| 604,758 | 5/1898 | Jeansen . |
| 3,096,999 | 7/1963 | Ahlstone et al. ............... 166/341 X |
| 3,101,968 | 9/1962 | Cianchette et al. ................. 294/104 |
| 3,298,092 | 1/1967 | Dozier et al. ..................... 166/343 X |
| 3,325,190 | 6/1967 | Eckert et al. ..................... 166/340 X |
| 3,751,932 | 8/1973 | Matthews ............................ 405/173 |
| 3,841,665 | 10/1974 | Capot ............................. 166/340 X |
| 3,842,612 | 10/1974 | Arnold ............................... 405/173 |
| 4,097,084 | 6/1978 | Russell ............................. 294/104 |
| 4,109,712 | 8/1978 | Regan ............................... 166/340 |
| 4,153,381 | 5/1979 | Hawley ............................. 405/173 |
| 4,234,268 | 11/1980 | Scodino ............................ 405/158 |
| 4,444,528 | 4/1984 | Scodino et al. ..................... 405/173 |
| 5,044,827 | 9/1991 | Gray et al. ........................ 405/173 |

OTHER PUBLICATIONS

Second Generation Diverless Buckle Recovery Tools for Shell's 12" Bullwinkle Gas Pipeline Installation, F. Kopp and R. T. Gilchrist, Shell Development Company.

Primary Examiner—Dennis L. Taylor
Attorney, Agent, or Firm—Del S. Christensen

[57] ABSTRACT

A clamp is disclosed which is capable of latching on to a buckle arrestor on a subsea pipeline which has been severed in the vicinity of the buckle arrestor. By severing the pipe in this location and utilizing the buckle arrestor to latch the clamp on to the pipe, a simple and reliable clamp is used. A method to recover such a subsea pipeline by severing the pipeline in the vicinity of the buckle arrestor and utilizing such a clamp is also disclosed.

13 Claims, 2 Drawing Sheets

SUBSEA PIPELINE RECOVERY CLAMP

FIELD OF THE INVENTION

This invention relates to an apparatus and a method to lift a pipeline from the floor of a body of water.

BACKGROUND OF THE INVENTION

Pipelines are typically laid across large bodies of water by welding one segment of pipe at a time on to the pipeline on a surface ship or barge. The pipelines are typically laid air-full to reduce the weight of pipe which must be supported from the water surface. The pipe must bend sufficiently to accommodate being welded at the water surface. Typically, this bending moment does not cause any problem. But occasionally the bending moment will exceed the capacity of the pipe to bend. This can happen, for example, when the surface ship does not maintain the proper position over the laid pipeline. When the pipeline is forced to bend beyond its capacity to bend, it will buckle. When a buckle is initiated in deep water, the hydrostatic pressure from the water may force the buckle to propagate. The buckle will often also result in cracking the pipe, thus permitting air to escape and the pipeline will fill up with water. The pipeline will then be too heavy to be supported from the surface ship. The pipeline will then be dropped to the ocean floor.

To prevent a buckle from destroying a very long length of laid pipeline, buckle arrestors are incorporated along the pipeline. Buckle arrestors are relatively ridged rings around the circumference of the pipe. These rings are sufficiently stiff to stop buckles. They resemble flanges with the pipe welded to each side. Buckle arrestors are typically placed each 400 to 1000 feet.

When a pipeline has buckled and is laying on the ocean floor, the end of the buckle must be located, the pipe must be cut beyond the end of the buckle, the good pipe must be dewatered, and the good pipe must then be lifted to the surface. An apparatus capable of accomplishing this is described in U.S. Pat. No. 4,444,528. This apparatus comprises means to clamp on to a submerged pipeline, a means to cut the pipe and a recovery header which can then be inserted into the open pipeline. After the recovering header is inserted into the pipeline, it is detached from the clamp, and the clamp is then released and removed to the surface. The recovery header is a sleave which fits inside of the severed pipeline with a bullhead which extends out of the severed pipeline to which a lifting cable is attached. The recovery header is attached to the pipeline by a dowel. The dowel passes through holes drilled in the pipeline by a drill which is attached to the clamp. Dowels are placed through the holes in the pipeline and into receptacles within the recovery header, after the recovery header is inserted into the pipe. The recovery header also serves as a stop for a pig which is used to remove water from the pipeline prior to lifting the pipeline to the surface.

This apparatus solves many of the problems associated with the prior art described within Patent '528. But it does so with an extremely complicated and relatively expensive piece of equipment. Failures of pipe-lines are a relatively rare occurrence. This equipment must therefore be purchased and maintained for very infrequent use. Considering the complex nature of the apparatus, the infrequency of its use and the hostile environment in which it is to be used, a high degree of operational reliability is not to he expected. Further, a considerable amount of money must be invested considering the infrequent use.

Another apparatus which can be used to lift a pipeline from the floor of an ocean is an internal clamp. U.S. Pat. No. 4,234,268 discloses an internal clamp used as a recovery header with an apparatus similar to that disclosed in '528. After the pipeline has been severed, the internal clamp is inserted into the end of the pipeline. This clamp is attached to the pipe by packers which expand outward and press against the inside surface of the pipeline. This internal clamp serves the dual purposes of acting as a pig-stop and as a way to attach a lifting means to the severed pipeline. Because frictional forces against the inside of the pipeline are utilized to attach the internal clamp to the pipeline, very large forces against the pipe wall are required. Further, because the pipeline is typically severed by an explosive cutting means, which causes jagged edges and causes the pipe to flare inwards, the internal clamp must fit very loosely into the pipe. Generating sufficient forces against the internal pipe wall with a very loose initial fit is difficult. Therefore, use of an internal clamp will usually require that a cut be made without jagged edges or other pipe end deformation. This, in turn, requires a saw or high pressure water-jet cut, which requires expensive and complex equipment.

Numerous horseshoe-type external pipeline clamps are also known. U.S. Pat. Nos. 3,101,968, 4,097,084, and 604,758 (filed May 31,1898) disclose various horseshoe-type external clamps. As applied to the recovery of a pipeline from the floor of a body of water, these clamps do not include a means to stop a dewatering pig. Another means to dewater the pipe would therefore be required if an external horseshoe-type clamp were utilized. Further, the horseshoe-type clamps do not permit recovery of the pipeline directly over the "stinger" of a pipe-laying vessel. The stinger of a pipe-laying vessel is a support which extends from the vessel and into the water. It provides support for the pipe as it is being layed. It would be preferable to recover a pipeline directly onto the stinger. A clamp having a streamlined profile would enable the clamp and pipeline to be pulled directly onto the stinger, thus facilitating resumption of pipelaying.

It is therefore an object of the present invention to provide a relatively simple pipeline clamp for attaching a lifting means to a severed pipeline on an ocean floor and a method to recover such a pipeline to the surface. It is a further object to provide such a clamp which utilizes buckle arrestors, or similar circumferential ridges to attach the clamp to the pipeline. It is another object to provide a clamp which is of a streamlined profile which allows recovery over the stinger of a pipe-laying vessel.

SUMMARY OF THE INVENTION

These and other objects are accomplished by a pipe clamp for attaching a lifting means to a subsea pipe which is severed in the vicinity of a raised circumferential ridge, the clamp comprising:

an aligning means which is capable of surrounding an open end of the severed subsea pipe;

at least one latching means which is connected to the aligning means and, when the aligning means is placed over the pipeline end, is capable of sliding over the circumferential ridge and latching against the circumferential ridge to prevent the clamp from sliding off the pipeline; and a means for attaching the clamp to the lifting means.

This clamp preferably further comprises a pig-stopping plate to enable dewatering of the pipeline without further apparatus being attached to the pipeline. This clamp is relatively simple and therefore less expensive and more reliable than prior art clamps.

The method of utilizing such a clamp comprises the steps of:

locating a buckle arrestor which has undamaged pipe on each side of the buckle arrestor;

severing the pipe in the vicinity of the located buckle arrestor, on the side of the buckle arrestor opposite to the portion of pipe to be recovered;

providing a clamp comprising:

an aligning means which is placed over the open end of the severed pipe, a latching means connected to the aligning means which is capable of latching to the buckle arrestor and a means to attach the clamp to a lifting means;

placing the clamp over the severed end of the pipe to be recovered;

latching the latching means on to the buckle arrestor; and lifting the pipe from the sea floor by a lifting means which is attached to the clamp.

This method utilizes the buckle arrestors to simplify the procedure and equipment necessary to recover a buckled or otherwise failed subsea pipeline.

DETAILED DESCRIPTION OF THE INVENTION

Figure 1:
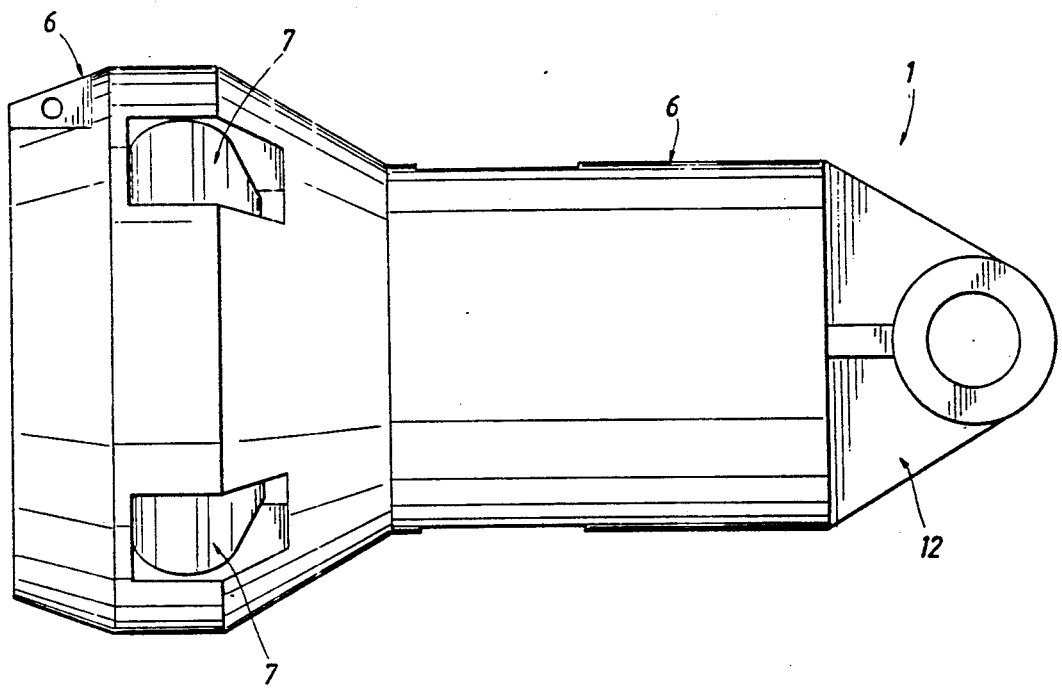
FIG. 1 is a profile view of the preferred clamp of this invention.
Figure 2:
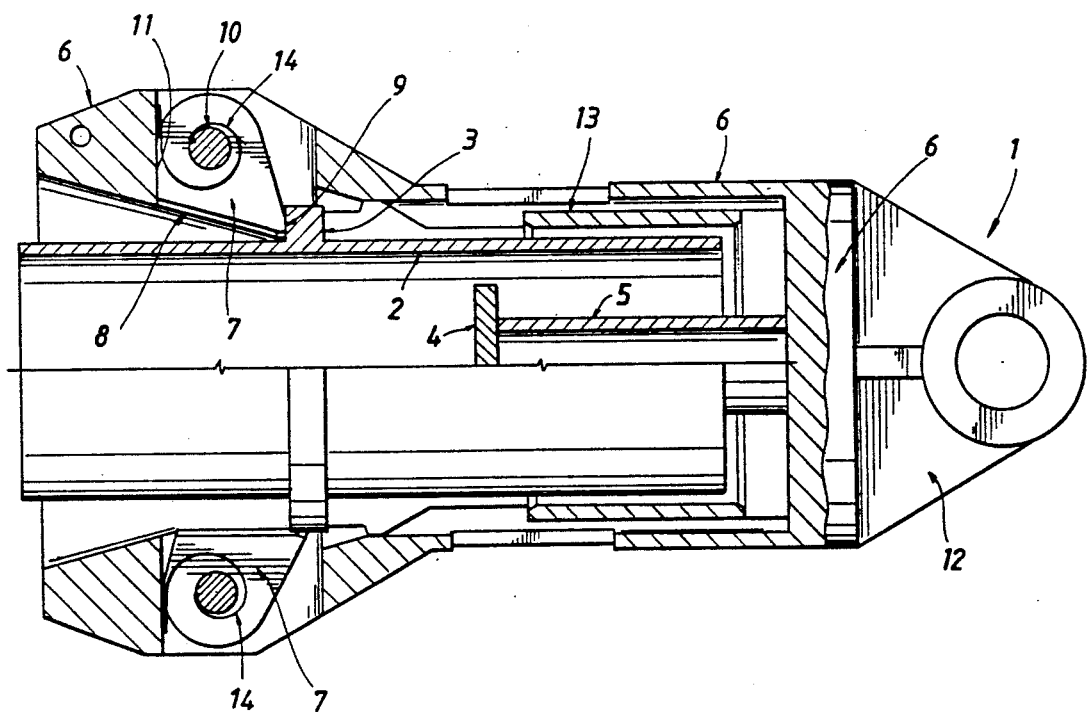
FIG. 2 is a cross-sectional view of the clamp of this invention.

Referring to FIGS. 1 and 2, a preferred embodiment of the pipeline clamp of this invention is shown in profile view and in sectional view, respectively. The clamp, 1, is shown attached to a pipeline, 2. The pipeline has been severed in the vicinity of a raised ridge, 3. The raised ridge is a buckle arrestor in this preferred embodiment. An external housing, 6, has a front end that moves over the pipe end, and a back end which supports a pig-stopping plate, 4, a bracket, 12, to attach a lifting means, and an aligning pipe, 13. The aligning pipe could be internal or external. It is preferably external because the pipeline is often severed by explosive charges. This results in a jagged internal diameter. A much closer clearance between the pipeline and the aligning pipe is therefore possible with the aligning pipe being external. Of course, the aligning pipe could be a series of rods, baffles, plates, or smaller pipes.

The buckle arrestor can be any raised ridge, such as a collar, cast-on anode or buckle arrestor. This raised ridge will be referred to herein as a buckle arrestor.

Because the pipeline cannot always be severed at exactly a preferred distance from the raised ridge, the pig-stopping plate and aligning pipe must accommodate a variety of lengths between the raised ridge and the and of the pipe. This is accomplished by extending the aligning pipe, 13, and pig-stopping plate 4, away from the external housing, 6, to accommodate varying lengths of pipe. The pig-stopping plate is therefore supported by a pig-stopping plate support, 5, which extends Into the severed end of the pipeline, 2.

Latching dogs, 7, are supported on hinge pins, 10, near the front of the external housing. The latching dogs swing radially inward toward the center line of the pipeline. The latching dogs have sloped inward edges, 8, which permit the raised ridge on the pipeline to pass the latching dogs as the clamp slides onto the pipe. When the dogs are swung toward the centerline of the pipeline and the clamp is slid onto the pipeline, the edge of the latching dog toward the front end of the external housing, 11, rests against the external housing. The external housing therefore supports most of the weight of the pipeline when the clamp is being used to lift the pipeline. When the latching device is swung toward the center line of the pipeline, the edge of the latching dogs opposite the front edge of the external housing, 9, lock the raised ridge into the clamp. The pipeline can then be raised by a lifting means attached to the clamp.

The hinged dogs of the preferred embodiment preferably utilize torsion springs, 14, to urge the latches toward the centerline of the of the pipeline. The dogs could also be operated hydraulically, but this complicates clamp design and is therefore not considered a preferred solution.

The preferred number of latching dogs is four. The dogs must be strong enough for two to lift the pipeline, because not all the dogs will necessarily latch when the lift force is not aligned with the longitudinal axis of the pipeline. Having four dogs permits the use of sturdy, large latching dogs with two of the latching dogs capable of carrying the weight of the pipeline.

Figure 3:
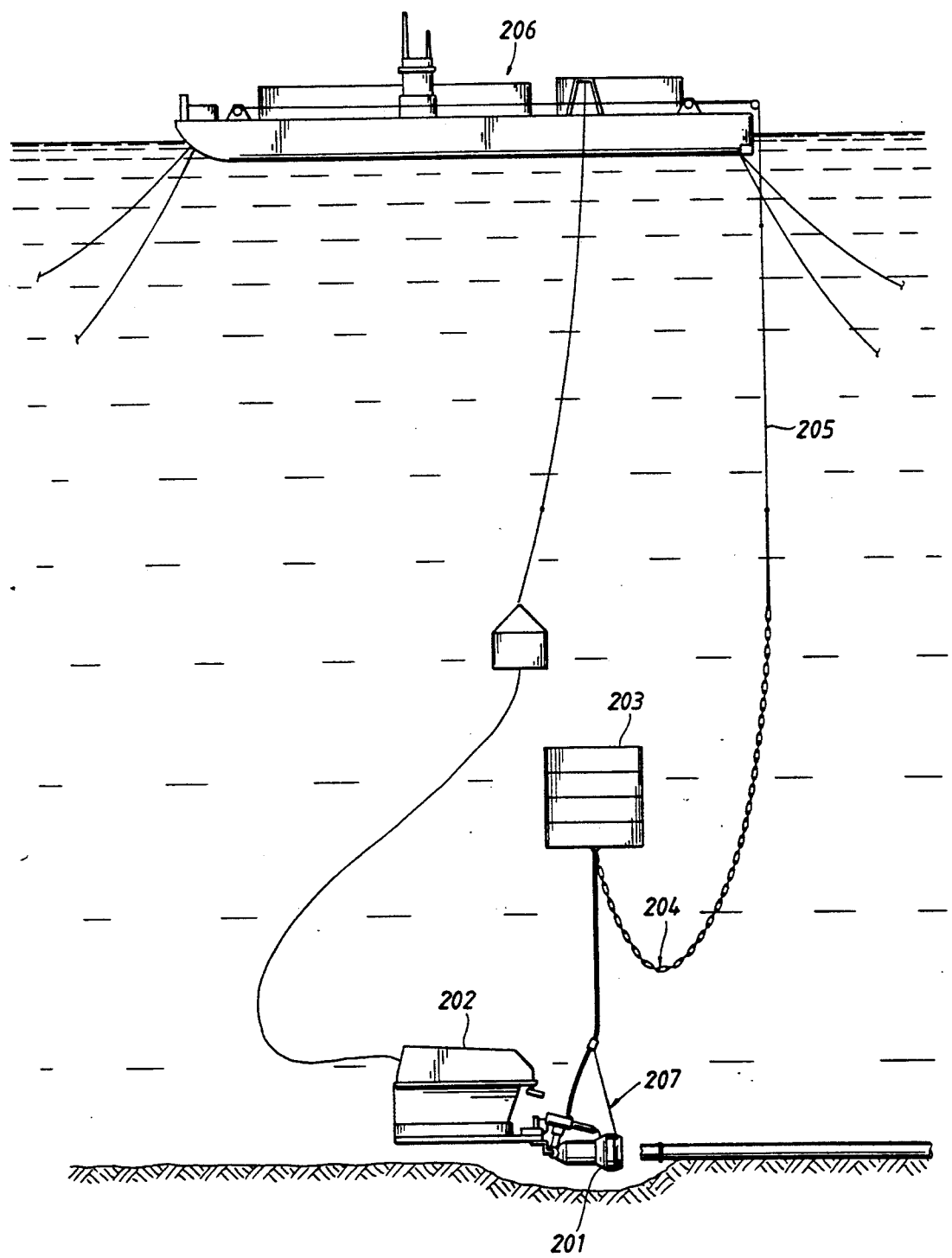
FIG. 3 is a schematic of the use of the pipeline clamp of this invention to recover a severed pipeline.

Referring to FIG. 3, a schematic diagram of how the clamp of this invention would be utilized is shown. The clamp, 201, is maneuvered by a remotely operated vehicle (ROV), 202, which is controlled by an operator at the water surface. The weight of the clamp, 201, is supported by a buoy, 203. The net buoyancy of the buoy is that of the clamp, and a segment of chain, 204. The elevation of the clamp can therefore be controlled from a surface ship, 206, by a cable, 205. The weight supported by the surface ship is only that of the cable, 205, and the portion of the heavy chain, 204, which exceeds the net buoyance of the buoy and the clamp. The cable, 207, is used to balance the clamp to the right attitude.

ROVs are well known in the subsea pipe-laying industry and many are commercially available which are capable of controlling the clamp of this invention. The cable, 207, can be broken or cut by the lifting force upon lifting of the pipeline. This results in the streamlined profile necessary for recovery of the pipeline and clamp over the stinger of the pipe-laying vessel.

A most preferred method to utilize the clamp of this invention includes using a buoy, 203, and a heavy chain, 204, which cooperate to establish a natural period for the buoy-chain-clamp system which is significantly greater than the wave period acting on the surface vessel from which the cable, 205, is supported. The buoy system will therefore act as a heave compensating support system and permit the ROV, 202, to control the clamp without the movement of the surface ship significantly affecting the position of the clamp.

The clamp of this invention can be utilized by the following procedure:

1. The failed pipeline is surveyed, and a buckle arrestor in undamaged pipe is located.

2. The sea floor under the appropriate buckle arrestor may be dredged to provide clearance for an explosive pipe cutter, and the pipeline clamp of this invention.

3. The pipeline is cut, preferably by an explosive cutter on the side of the appropriate buckle arrestor toward the pipe which is to be abandoned. The pipeline is severed at a distance from the buckle arrestor which is large enough that the aligning pipe extends over the pipeline end when the buckle arrestor Is against the latching dogs, and short enough so that the clamp may be placed far enough over the pipeline end to allow the latching dogs to latch against the buckle arrestor. The distance is preferably between about 9 and about 18 inches.

4. The severed portion of the pipeline which is not to be recovered may then be moved aside so the clamp can be aligned in front of the severed end of the pipeline which is to be recovered. This pipeline may be moved, for example, by an external pipe clamp, or by dragging an anchor from the surface ship.

5. The clamp of this invention can be lowered to the pipeline and lined up with the pipeline to be recovered by maneuvering the clamp with an ROV and pushed over the end of the severed pipeline. The ROV can then be disengaged from the clamp.

6. The pipeline can then be dewatered by forcing a pig from the remote end of the pipeline to the pig-stopping plate.

7. The clamp and dewatered pipeline then may be lifted to the surface by raising up from the surface ship by the cable.

8. When the buoyance module is near the surface, it may be disconnected from the clamp and recovered.

9. The clamp and pipeline end are then lifted on to the surface ship where the clamp may be removed.

The clamp of this invention may be used to recover pipelines in a wide variety of situations. For example, when pipe laying is interrupted by weather, a cap is typically welded onto the end, and the pipeline is lowered to the seafloor by a cable, and the cable is supported at the surface by a buoy. The pipe can then easily be raised onto a surface vessel stinger for resumption of pipe-laying. But if a buckle arrestor is placed on the pipe end with the cap, and the cable is connected to the cap by a pin which is removable by an ROV, the clamp of the present invention can be used to recover the pipeline if the buoy is damaged or lost. The use of the clamp of this invention allows recovery of the pipe directly onto the stinger of the pipe-laying vessel in this situation.

Other modifications, changes, and substitutions are intended in the foregoing disclosure, and in some instances, some features of the invention will be employed without a corresponding use of other features.

We claim:

1. A pipe clamp for attaching a lifting means to a subsea pipe which is severed in the vicinity of a raised circumferential ridge, the clamp comprising:

an aligning means which is capable of surrounding an open end of the severed subsea pipe;

at least one latching means which is connected to the aligning means and, when the aligning means is placed over the pipeline end, is capable of sliding over the circumferential ridge, and latching against the circumferential ridge to prevent the clamp from sliding off the pipeline; and a means for attaching the clamp to the lifting means.

2. The pipe clamp of claim 1 wherein the aligning means is a pipe of a larger external diameter than the external diameter of the severed pipe.

3. The pipe clamp of claim 1 wherein the latching means comprises a plurality of latching devices.

4. The pipe clamp of claim 1 further comprising a pig-stopping means.

5. The clamp of claim 1 wherein the latching means comprise a plurality of hinged dogs, supported circumferentially from an external sleeve, the hinged dogs being capable of latching against the circumferential ridge.

6. The clamp of claim 5 wherein the hinged dogs have a sloped edge toward the center line of the pipeline and are urged radially toward the center line of the severed pipe by spring means.

7. The clamp of claim 6 wherein the hinged dogs have flat edges which are capable of locking against the raised circumferential ridges.

8. The clamp of claim 5 further comprising a means to move the dogs toward the centerline of the severed pipe to lock the clamp onto the severed pipe.

9. The clamp of claim 8 wherein the means to move the dogs is a hydraulic means.

10. A method to recover a pipe having buckle arrestors from a sea floor comprising the steps of:

locating a buckle arrestor which has undamaged pipe on each side of the buckle arrestor;

severing the pipe in the vicinity of the located buckle arrestor on the side of the buckle arrestor opposite the portion of pipe to be recovered;

providing a clamp comprising:

an aligning means which is placed over the open end of the severed pipe, a latching means connected to the aligning means which is capable of latching on to the buckle arrestor, and a means to attach the clamp to a lifting means;

placing the clamp over the severed end of the pipe to be recovered;

latching the latching means on to the buckle arrestor; and lifting the pipe from the sea floor by a lifting means which is attached to the clamp.

11. The method of claim 10 further comprising the steps of removing water from inside of the pipe before lifting the pipe from the sea floor.

12. The method of claim 11 wherein the water is removed from the pipe by a pig which is forced toward the clamp by air pressure from the pipe to be recovered.

13. The method of claim 10 wherein the pipe is severed by an explosive cutter.

* * * * *